Esek Bussey,
Cooking Stove.

Sheet 1
3 Sheet.

No 3649.

Reissued Sep. 28. 18[illegible]

Witnesses:

Chas. A. Wood
Austin F. Park.

Inventor:

Esek Bussey

Sheet 2
3 Sheets.

Esek Bussey,
Cooking Stoves.

No 3649.

Reissued Sep 28 1869.

Witnesses:
Chas Sellers
Austin F. Park

Inventor:
Esek Bussey

Sheet 3
3 Sheets.

Esek Bussey,
Cooking Stoves.

No 3649. Reissued Sep. 28. 1869

Witnesses:

Chas. Stell Lee
Austin F. Park.

Inventor:

Esek Bussey

UNITED STATES PATENT OFFICE.

ESEK BUSSEY, OF TROY, NEW YORK.

IMPROVEMENT IN COOKING-STOVES.

Specification forming part of Letters Patent No. 56,525, dated July 24, 1866; Reissue No. 3,649, dated September 28, 1869.

*To all whom it may concern:*

Be it known that I, ESEK BUSSEY, of the city of Troy, in the county of Rensselaer and State of New York, have invented certain new and useful Improvements in Cooking-Stoves, of which the following is a full and exact description, reference being had to the accompanying drawings, in which—

Figure 1:
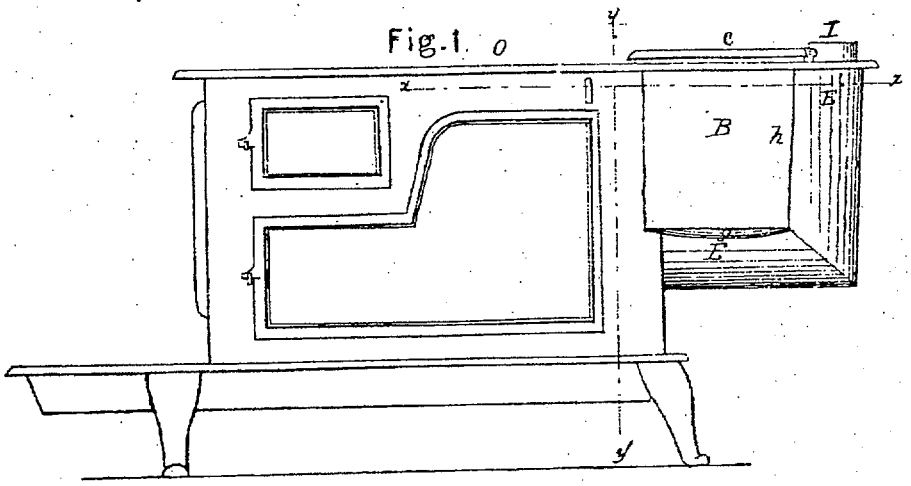
Figure 2:
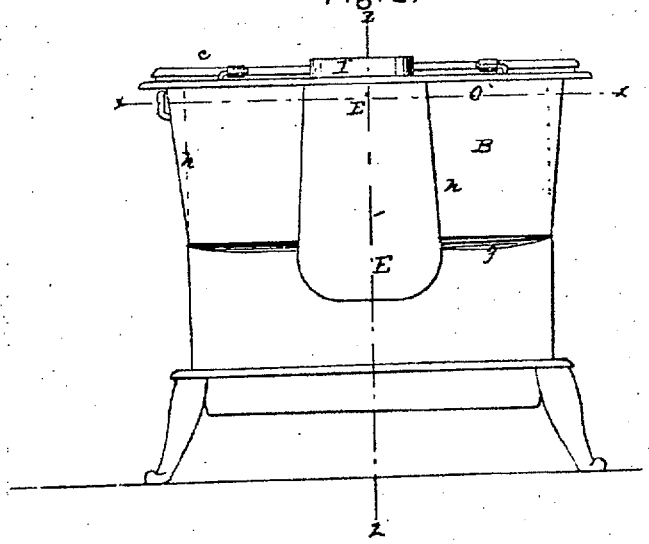
Figure 3:
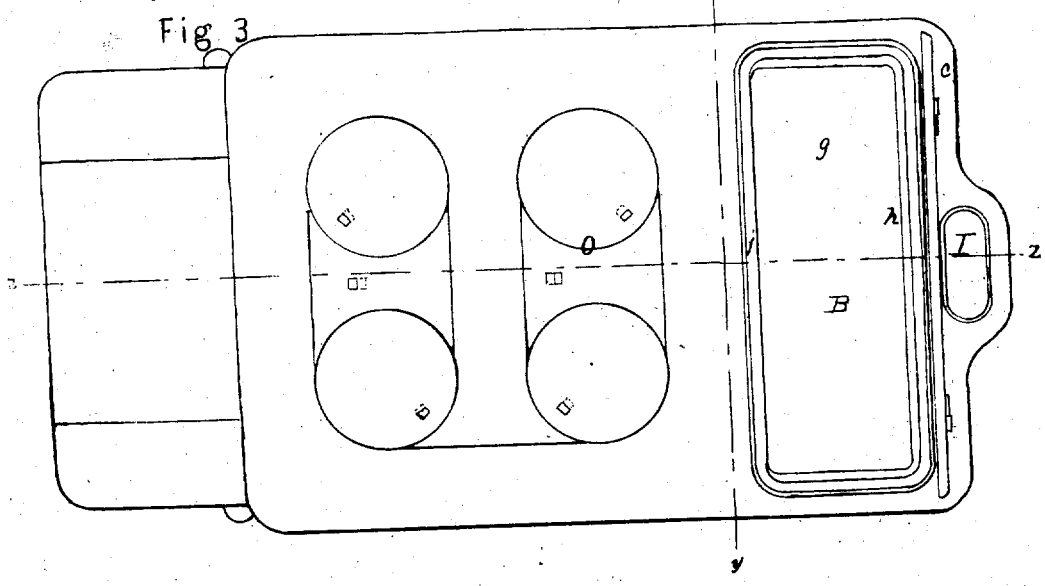
Figure 4:
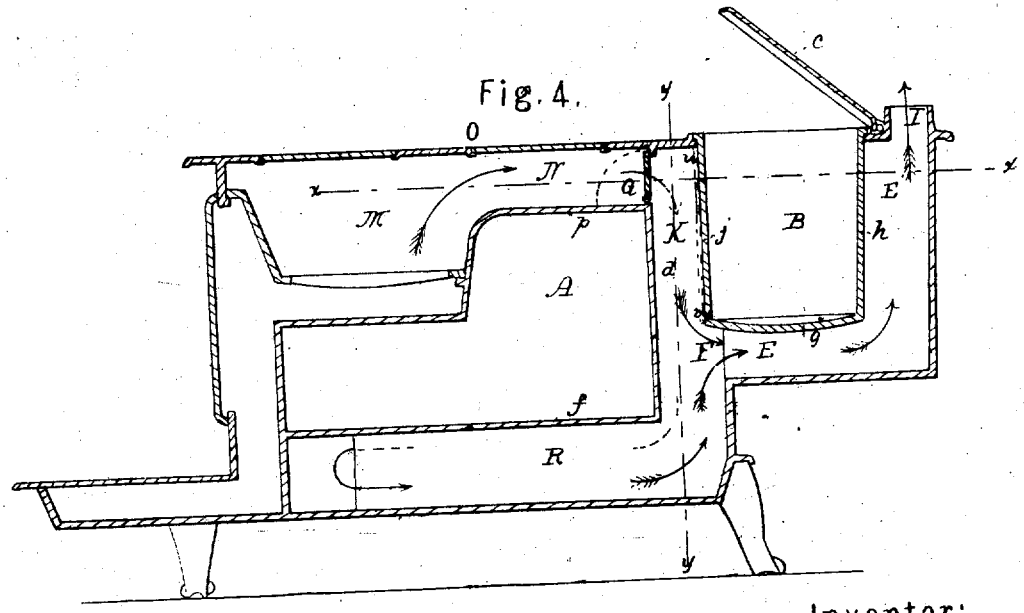
Figure 6:
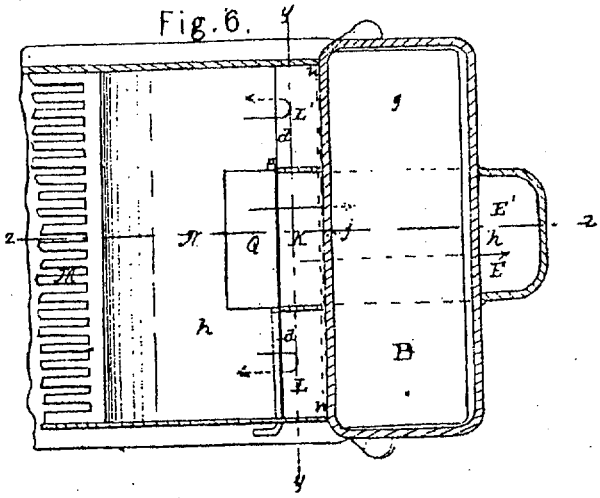
Figure 5:
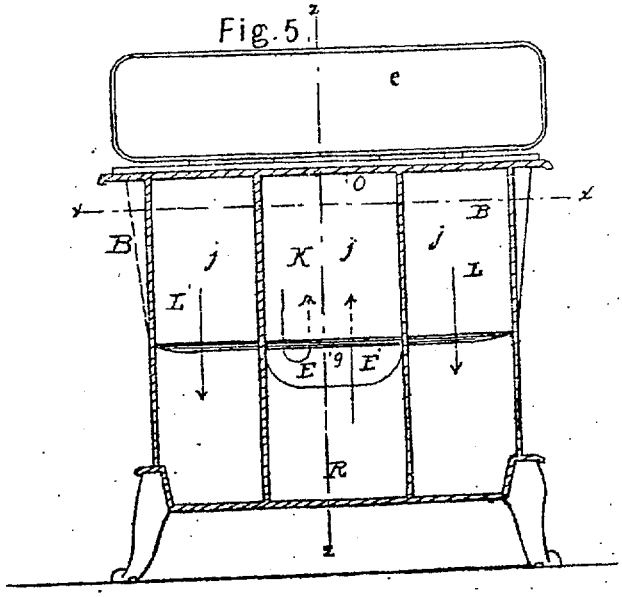

Figure 1 is a side elevation; Fig. 2, a rear elevation; Fig. 3, a plan; Fig. 4, a vertical section at the line *z z;* Fig. 5, a front view of a section at the line *y y;* and Fig. 6, a top view of a partial section at the line *x x*, all of a cooking-stove embodying my said invention, like parts being marked by the same letters in all the figures, and the arrows therein being indicative of the courses in which the gases of combustion pass through the stove.

One part of my invention consists in arranging a culinary boiler or hot-water reservoir in the rear of the oven of a diving-flue cooking-stove with an exit-flue extending down the front, under the bottom, and up the rear of the said reservoir, substantially as hereinafter described and specified.

It also consists in arranging a culinary boiler or hot-water reservoir in the rear of the oven of a diving-flue cooking-stove with an exit-flue leading from some point in the rear vertical flue or flues below the top of the said oven and continuing under the bottom and up the rear side of said reservoir, substantially as hereinafter described and specified.

It also consists in the arrangement of a diving-flue cooking-stove with an exit-passage constructed in the vertical rear flue or flues thereof and below the top of the oven in such a manner that the gases of combustion, after passing through such exit-passage, will impinge upon or come in contact with the bottom or sides of a reservoir placed in the rear of the stove and just above said exit-passage, substantially as hereinafter described and specified.

In illustration of my invention the aforesaid drawings represent a cooking-stove having an oven, A, a culinary boiler or hot-water reservoir, B, arranged opposite to the rear upright side or end, *d*, of the oven, and an exit-flue, E E′, extended from the central vertical flue, K, of said stove at a point below the top of the oven, under or across the bottom *g* of the reservoir, and from thence up along the rear upright side of said boiler or reservoir to the draft-pipe I.

Between the inner side, *j*, of the boiler B and the flue K a plate may be employed, indicated by the dotted line *v v;* but I generally prefer to dispense with this plate, in which case the inner side, *j*, of the said boiler will form the lateral rear casing of the said vertical flue K, and will be heated by direct contact with the gases of combustion as they pass down the said flue.

L L′ are the side vertical flues, and K is the central vertical flue, of the said cooking-stove. M is the fire-box, and N and R the top and bottom flues of said stove.

The operation of my said invention is as follows: A fire being kindled in the fire-box M and the damper Q at the top of the oven being open so as to allow of a direct draft, the gases of combustion from the said fire-box will pass down the middle vertical flue, K, through the exit-passage F and exit-flue E E′ to the smoke-pipe I, heating the contents of the reservoir in its passage through the exit-flues, as aforesaid.

By this mode of construction I am enabled to obviate what has been heretofore the greatest objection to reservoir-stoves of this class, namely, that the reservoirs would not heat with a direct draft.

It will also be observed that by this device of constructing the exit-passage below the top of the oven I can at the same time, by a direct draft, heat the rear side of the oven and the reservoir, instead of wasting the heat by carrying it directly to the chimney.

When the damper Q is closed for the purpose of heating the oven, the gases of combustion will pass down the side vertical flues, L L′, and under the bottom of the oven, returning through a central horizontal flue to the central vertical flue, K, from which they pass through the exit-flue E E′, as aforesaid.

I am aware that cooking-stoves have been in use in which the reservoir is "incased" or inclosed on all sides, except the top, by a kind of expanded flue, through which the gases of combustion are made to pass.

The advantages of my plan over this device are twofold: First, it is much more economical, requiring far less material labor to construct it; and, second, by confining the heat and gases of combustion to a small space at the bottom and rear of the reservoir the contents thereof will be much more effectually heated than where the products of combustion are admitted to an extensive flue-space and permitted to rise and expend their heat at or near the top of the reservoir.

Having described the construction and operation of my said invention, what I claim as new, and desire to secure by Letters Patent, is—

1. A diving-flue cooking-stove with the exit-flue so constructed as to inclose on the sides and bottom the culinary boiler or hot-water reservoir B.

2. A diving-flue cooking-stove with the exit-flue constructed across the bottom and up the rear upright side of the culinary boiler or hot-water reservoir B.

3. A diving-flue cooking-stove constructed with an exit-passage, F, below the top of the oven, and an exit-flue, E E′, in combination with an uncased reservoir, B, attached to the rear of the stove, and placed just above such exit-passage, and so arranged that the gases of combustion in passing through such exit-flue will impinge upon or come in direct contact with said reservoir, substantially as and for the purposes hereinbefore specified.

4. An exit-passage, F, constructed in the rear of a diving-flue cooking-stove and below the top of the oven, in combination with an uncased reservoir, B, attached to the rear of the stove, the bottom of which reservoir is also below the top of the oven, and so arranged that the gases of combustion will come in contact with and heat such reservoir by a direct draft from the fire-box to the smoke-pipe.

In witness whereof I have hereunto set my hand this 22d day of June, 1869.

ESEK BUSSEY.

Witnesses:
E. COWEN,
FRANCIS A. WOODS.